US010183671B2

(12) United States Patent
Steffes et al.

(10) Patent No.: US 10,183,671 B2
(45) Date of Patent: Jan. 22, 2019

(54) TORQUE CONVERTER LOCKUP CONTROL

(71) Applicant: Caterpillar Inc., Peoria, IL (US)

(72) Inventors: Adam L. Steffes, Washington, IL (US); Raymond E. Durbin, Metamora, IL (US); Arthur Melvin Morris, Peoria, IL (US); Mark E. Hull, Germantown Hills, IL (US); Matthew A. Johnson, Vail, AZ (US); Jeffrey Hynes, Tucson, AZ (US)

(73) Assignee: Caterpillar Inc., Deerfield, IL (US)

( * ) Notice: Subject to any disclaimer, the term of this patent is extended or adjusted under 35 U.S.C. 154(b) by 273 days.

(21) Appl. No.: 15/212,677

(22) Filed: Jul. 18, 2016

(65) Prior Publication Data
US 2018/0015924 A1    Jan. 18, 2018

(51) Int. Cl.
*B60W 10/02* (2006.01)
*B60W 10/06* (2006.01)
*B60W 30/188* (2012.01)

(52) U.S. Cl.
CPC ........ *B60W 30/188* (2013.01); *B60W 10/026* (2013.01); *B60W 10/06* (2013.01); *B60W 2510/0638* (2013.01); *B60W 2510/104* (2013.01); *B60W 2510/1005* (2013.01); *B60W 2510/1015* (2013.01); *B60W 2710/024* (2013.01); *B60W 2710/0644* (2013.01)

(58) Field of Classification Search
CPC .... B60W 10/026; B60W 10/06; B60W 10/11; B60W 30/188; B60W 2510/0638; B60W 2510/1005; B60W 2510/1015; B60W 2510/104; B60W 2710/024; B60W 2710/0644
See application file for complete search history.

(56) References Cited

U.S. PATENT DOCUMENTS

| 5,885,187 | A | * | 3/1999 | Tabata | ................. | B60W 10/06 477/107 |
|---|---|---|---|---|---|---|
| 8,296,028 | B2 | | 10/2012 | Matsunaga et al. | | |
| 8,972,118 | B2 | | 3/2015 | Brattberg | | |
| 9,216,741 | B2 | | 12/2015 | Tinker et al. | | |
| 2014/0018207 | A1 | * | 1/2014 | Kobayashi | ............... | B60K 6/48 477/5 |
| 2015/0039193 | A1 | * | 2/2015 | Livshiz | ................. | B60W 10/06 701/54 |
| 2015/0197252 | A1 | | 7/2015 | Tinker et al. | | |

* cited by examiner

*Primary Examiner* — Edwin A Young
(74) *Attorney, Agent, or Firm* — Miller, Matthias & Hull; Jeff A. Greene

(57) ABSTRACT

A system for managing a lockup clutch in an off-road truck includes an engine, a transmission and a torque converter coupled between the engine and the transmission. The torque converter has a lockup clutch that when engaged directly couples the engine to the transmission. The system also includes a transmission controller that disengages the lockup clutch responsive to sensing a missed shift in the transmission, and subsequent to sensing a completed shift, sets an engine speed limit corresponding to a gear associated with the completed shift, and reengages the lockup clutch.

20 Claims, 5 Drawing Sheets

TORQUE CONVERTER LOCKUP CONTROL

TECHNICAL FIELD

The present disclosure generally relates to off-road hauling machines and, more particularly, to drivetrains for off-road hauling machines.

BACKGROUND

Off-road hauling machines are designed to carry large payloads, often up or down steep inclines. Examples of such machines include dump trucks and the like. Such machines are powered by a drivetrain including in many cases, a prime mover or engine, a torque converter, a plurality of wheels or other traction device and a transmission which transmits high torque loads from the prime mover to the wheels under these conditions. Because of the high drivetrain power requirements, a lockup clutch of a torque converter is routinely engaged to minimize power loss. As conditions change, such as a change in grade or an increase in speed, the transmission steps through gear changes to optimize the engine speed to the required torque. Should a gear change in the transmission not progress as expected- and fail to make a clean transition to the new gear, a power surge can ripple through the drivetrain. In the most dramatic cases, this power surge can damage the drivetrain to the point of failure.

U.S. Pat. No. 9,216,741 ('741 patent), issued to the present assignee, is directed to sensing and controlling an engine speed for the purpose of matching crankshaft speed, that is, torque converter input speed, with torque converter output speed during lockup clutch engagement. The '741 patent relies on knowledge of prior and current engine speed when determining lockup clutch engagement and does not to prevent drivetrain damage in the case of a missed shift. It can therefore be seen that a need exists for drivetrain with reduced torque peaks and thus reduced susceptibility to drivetrain damage.

SUMMARY

According to one aspect of the disclosure, an off-road machine has an engine coupled to a torque converter that includes a lockup clutch. The torque converter is also coupled to a transmission. According to this aspect of the disclosure a method of performing shift recovery in the off-road machine includes engaging the lockup clutch of the off-road machine when a minimum threshold speed is reached and maintaining the engagement of the lockup clutch during operation of the off-road machine including normal shifting between gears of the transmission. The method continues when sensing a missed shift between gears in the transmission and disengaging the lockup clutch responsive to sensing the missed shift. The method also includes sensing a completed shift of the gears of the transmission, calculating an engine speed corresponding to a desired torque converter output speed, and setting a speed limit for the engine corresponding to the calculated engine speed. The method concludes by reengaging the lockup clutch following a delay time after setting the engine speed limit.

In another aspect of the disclosure, a method of recovering from a missed shift in an off-road machine that has an engine and a transmission which are coupled by a torque converter includes disengaging a lockup clutch of the torque converter responsive to sensing the missed shift between gears of the transmission. The method continues by sensing a completed shift between gears of the transmission, calculating a desired torque converter output speed corresponding to a transmission gear ratio for the completed shift, and calculating a desired engine speed necessary to reach the desired torque converter output speed. The method continues by setting an engine speed limit corresponding to the desired engine speed and reengaging the lockup clutch of the torque converter to mechanically couple the engine to the transmission following a delay time.

In yet another aspect of the disclosure, a system for managing a lockup clutch for shift recovery in an off-road truck includes an engine, a transmission, and a torque converter coupled between the engine and the transmission. The torque converter has the lockup clutch that when engaged directly couples the engine to the transmission. The system also includes a transmission controller that disengages the lockup clutch responsive to sensing a missed shift in the transmission, senses a subsequent completed shift, sets an engine speed limit corresponding to a gear associated with the completed shift, and reengages the lockup clutch.

These and other aspects and features will be more readily understood upon reading the following specification, drawings and claims.

DETAILED DESCRIPTION

Figure 1:
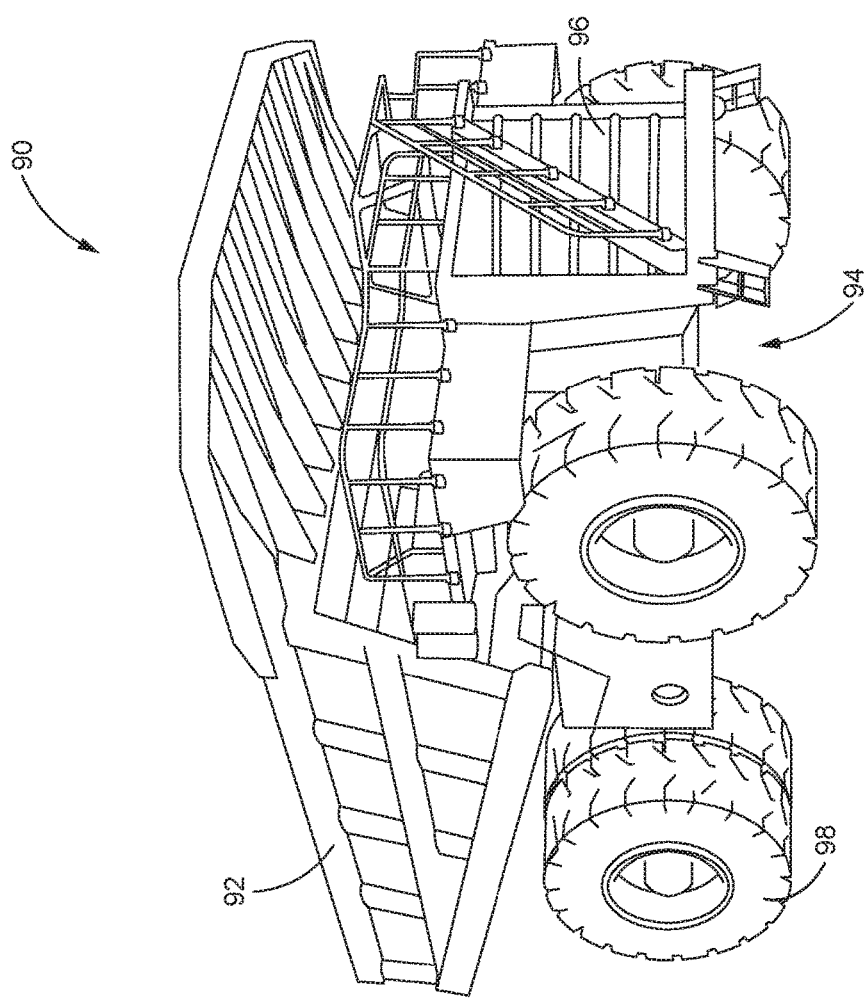
FIG. 1 is an exemplary off-road machine in accordance with the current disclosure.

Referring now to the drawings, and with specific reference to FIG. 1, an off-road hauling machine 90 suitable for use with the disclosed torque converter lockup control and constructed in accordance with the present disclosure, is generally referred to by reference numeral 90. While the machine 90 illustrated is a dump truck, other machine types can benefit from the concepts disclosed herein. These machines may be used in applications for industries including, but not limited to, earth-moving, construction, mining, agriculture, logging, transportation, and marine. The off-road machine 90 shown in FIG. 1 is used, in some embodiments to transport earth in a construction or mining application. In the case of an open pit mine or some construction projects, the machine 90 may need to navigate a steep grade with a full payload within dump body 92. Because transit times and fuel consumption affect efficiency, the machine 90 is generally operated at the highest safe speed with the best possible fuel efficiency. Traveling up or down a grade, with a load, at an optimal speed, requires a drivetrain 94 of the machine 90 to maximize power transfer from an engine 96 to wheels 98 and often involves gear changes under high loads to meet the desired performance.

Figure 2:
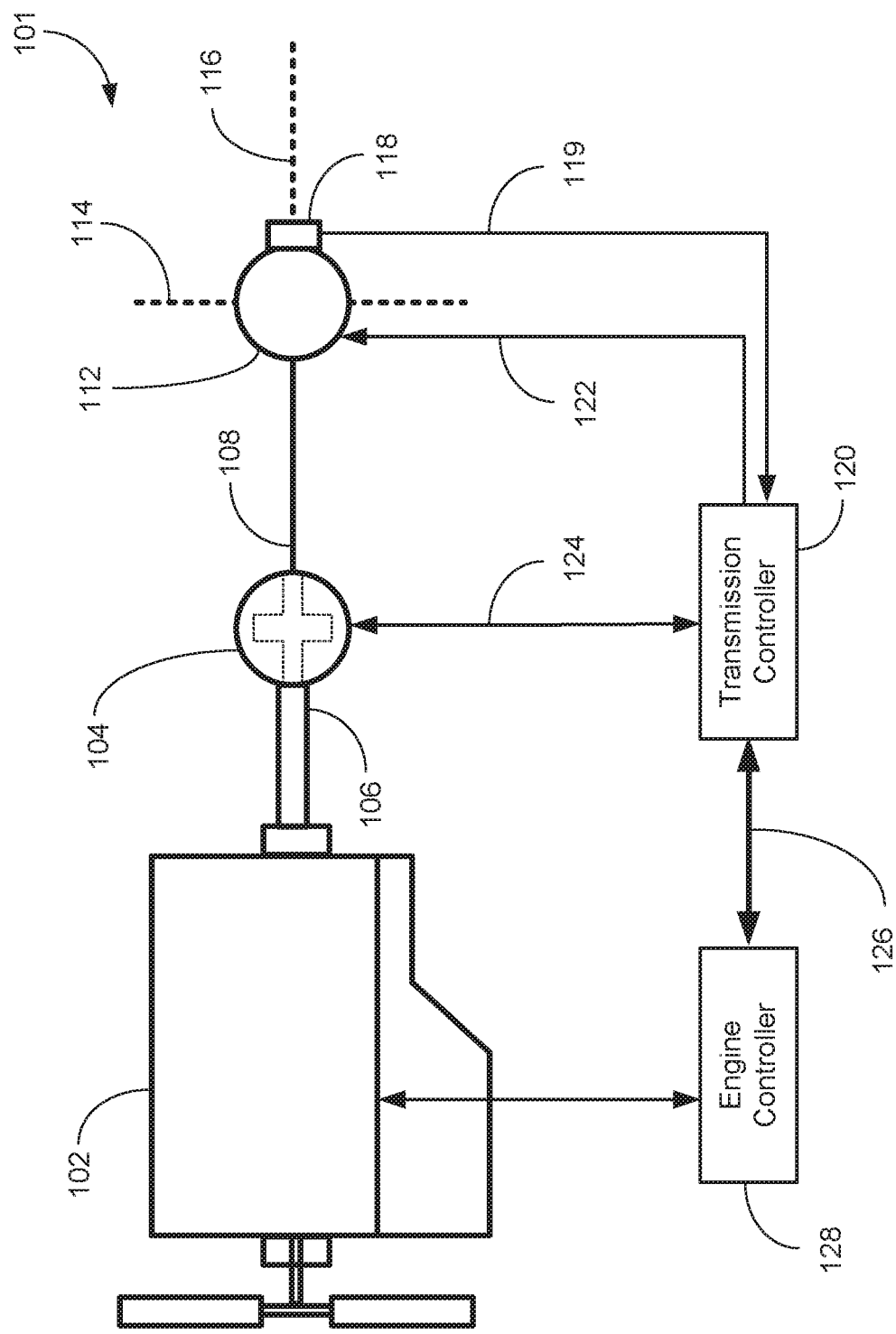
FIG. 2 is a simplified block diagram of a drivetrain of the off-road machine of FIG. 1.

A simplified and representative view of the drivetrain 94 of the off-road machine 90 is illustrated in FIG. 2. The prime mover or engine 96 is connected via a remainder of the drivetrain 94 to ground engaging devices, such as wheels 98.

The engine 96 is, in one embodiment, a diesel engine, but could be another type of engine. A torque converter 104, in the illustrated embodiment, is coupled between a crankshaft 106 of the engine 96 and a transmission shaft 108 that is coupled to a transmission 112. The transmission 112 drives an axle 114, a driveshaft 116, or both to bring power to the ground engaging devices 98. In various embodiments, the drivetrain line up may vary. For example, in some large off road trucks, an impeller of the torque converter 104 is bolted directly to a flywheel of the engine. A turbine of the torque converter may use a splined attachment to an input of the transmission so that there is no transmission shaft 108 as depicted in FIG. 2. In other embodiments, a transmission output shaft may use a splined coupling directly to a pinion of a differential, so that no driveshaft 116 exists per se. The teachings herein apply to any configuration of couplings between components of the drivetrain 94. In general, the engine 96 transfers power to an input of the torque converter 104 and an output of the torque converter 104 transfers power to an input of the transmission 112, which in turn has an output that transfers power to the wheels 98 or other ground engaging device.

The transmission 112 is an automatic transmission in many cases, but need not be.

A transmission sensor 118 reports, via a data link 119, a condition of the transmission 112 to a transmission controller 120. The transmission sensor 118 collects and reports data for various hydraulic pressures, input and output shaft speeds, actuator positions, etc., that are used to determine the current state of the transmission 112 in order to calculate the next state of the transmission 112.

The transmission controller 120 analyzes and controls a state of the torque converter 104 as well as the transmission 112. The transmission controller 120 can set shift points in the transmission 112 as well as control the lockup clutch and stator of the torque converter via a data connection 122. The transmission controller 120 can also sense missed shifts by a number of techniques including comparing input and output shaft speeds, that is, transmission shaft speed to driveshaft speed with a knowledge of the currently programmed gear ratio. A missed shift is when an input gear or an intermediate gear does not engage with an output gear or other intermediate gear so that the transmission is essentially in neutral for a period of time. This results in transmission input and output speeds that diverge from what is expected compared to a successfully completed shift. When the gears subsequently re-engage, the engine 96, transmission 112, or both may not be operating at the same speeds as when the shift was initiated. This speed mismatch at re-engagement is responsible for the torque ripple that can ultimately damage the drive train. Further, in very rare cases, the gear re-engagement may not be to the gear originally called for, which can further exacerbate the difference in speeds and increase the risk of damage to the drivetrain 94.

The engine controller 128 manages engine functions by reading a variety of inputs that monitor engine conditions and then controls, for example, fuel quantity delivered by fuel injectors, fuel injection timing, fuel injection mode, idle speed control, accessory power, and others. In an internal combustion gasoline engine, the engine controller 128 may also manage ignition timing. The engine controller 128, by controlling fuel quantity, sets the speed of the engine 96. In the illustrated embodiment, the engine controller 128 is communicatively coupled to the transmission controller 120, as well as other machine sensors and controllers via a communication bus 126. In an embodiment, the communication bus 160 conforms to the protocols and interface requirements set forth in the Society of Automotive Engineers (SAE) J1939 bus standard. The J1939 bus is particularly well suited to vehicle data communications.

Figure 3:
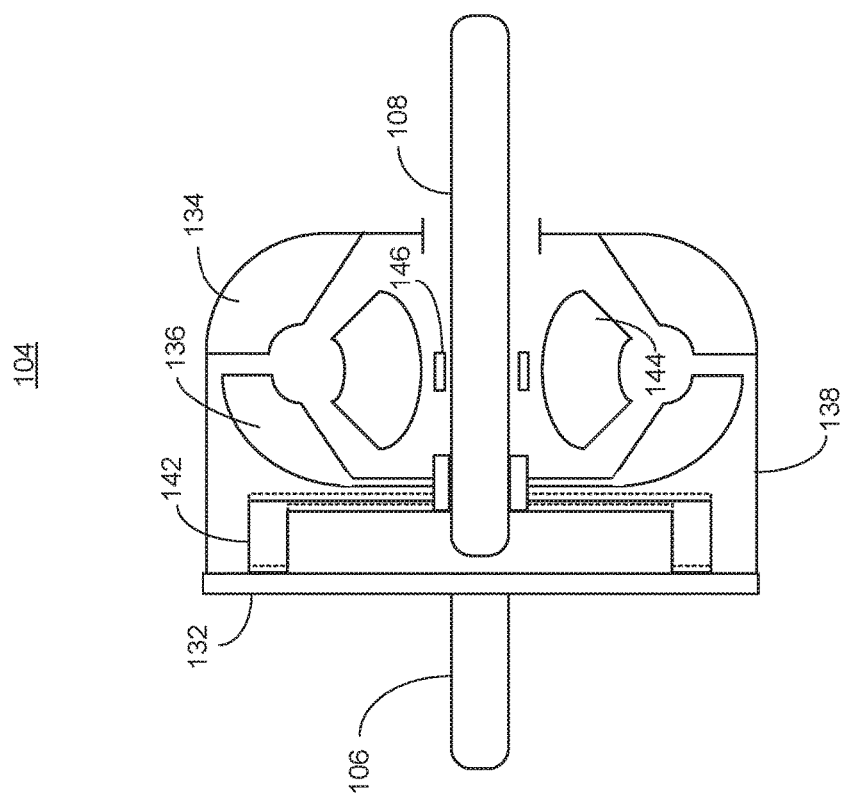
FIG. 3 is a cross-sectional view of a simplified and representative torque converter according to the present disclosure.
Figure 4:
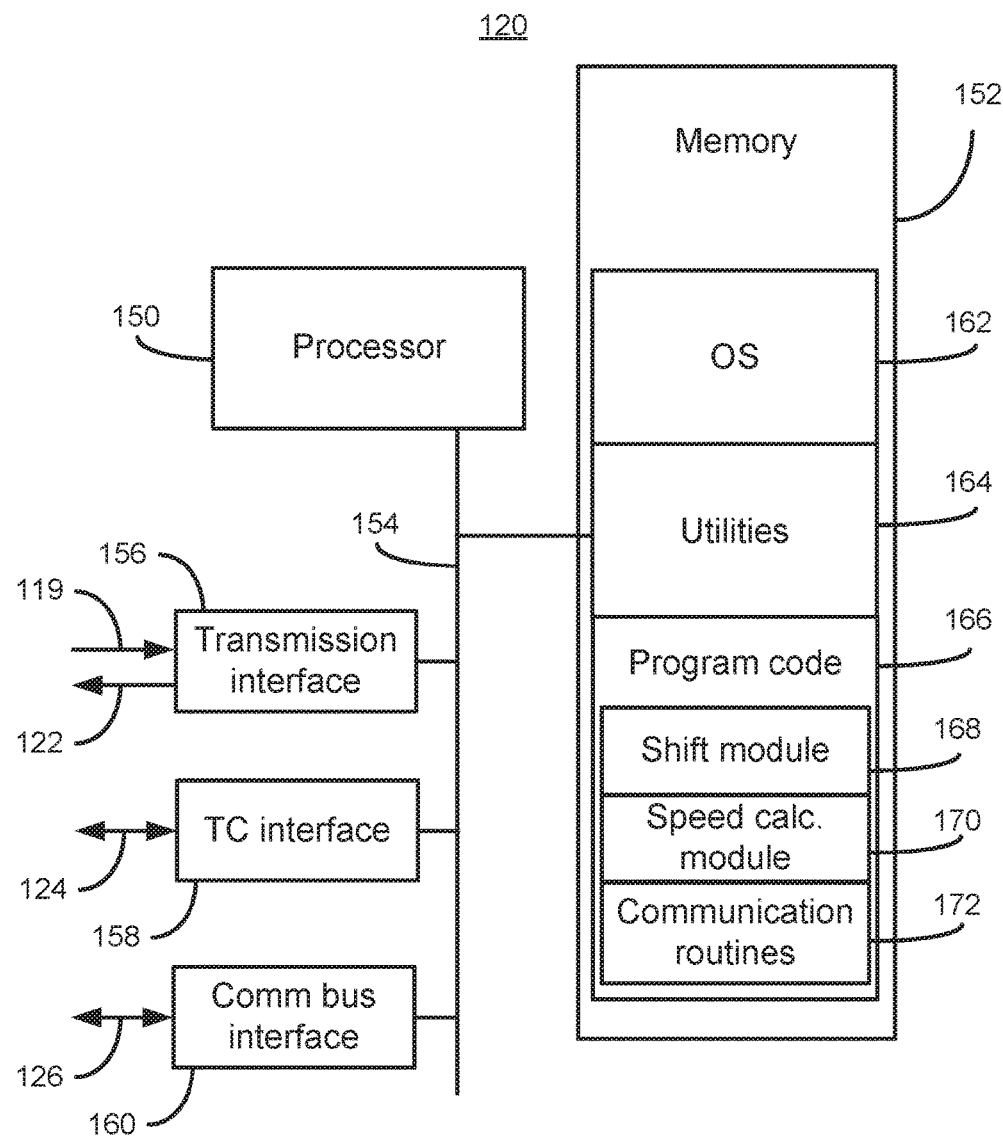
FIG. 4 is a block diagram of a transmission controller for the drivetrain of FIG. 2.

FIG. 3 illustrates a cross-section of an embodiment of the torque converter 104. The torque converter 104 is a power transfer device that has a rotating housing 132 is coupled to the crankshaft 106 of the engine. In an embodiment, the housing 132 may be coupled directly to a flywheel of the engine 96. An impeller 134 is coupled to the housing 132 and creates a fluid pressure that drives a turbine 136 coupled to the transmission shaft 108. A lockup clutch 142 is moveable between a disengaged state shown in dashed lines and an engaged state shown in solid lines. When engaged, the lockup clutch 142 transmits power directly from the crankshaft 106 (or flywheel) to the transmission shaft 108 bypassing any fluid coupling available via the impeller-turbine combination. In some embodiments, a stator 144 and one-way clutch 146 may also be used in the torque converter 104 for redirecting the fluid exiting the impeller 134 toward the turbine 136. When the lockup clutch 142 is disengaged and power is being transmitted via the fluid coupling, drivetrain shocks such as those associated with a missed shift are absorbed as a result of the viscous fluid coupling between the impeller 134 and turbine 136. However, there is also a corresponding power loss through eddy currents and friction, making it desirable to engage the lockup clutch 142 as quickly as possible during acceleration from a full stop and to keep it engaged as much as possible during normal operation.

A simplified and exemplary block diagram of the transmission controller 120 is found in FIG. 3. The transmission controller 120 includes a processor 150 coupled to a memory 152 by a data bus 154. The data bus 154 also connects the processor 150 to a variety of input interfaces and output drivers including a transmission interface 156, a torque converter interface 158 and a communication bus interface 160. In an embodiment, the communication bus interface 160 conforms SAE J1939 bus standard.

The transmission interface 156 receives data from the transmission sensor 118 via a data link 119. The transmission interface 156 also uses, in an embodiment, another data connection 124 in order to control the various actuators of the transmission 112 that accomplish changing gears.

The memory 152 may be any of several types of physical memory using volatile memory, non-volatile memory, or a combination of both. The memory 152 may not include carrier wave or propagated media. The memory 152 may include an operating system 162 that supports basic functions of the transmission controller including file management, instruction queuing, fault handling, startup and shutdown, and other known functions. The utilities 164 may include programs for operational setup and system diagnostics. The program code 166 incorporates executable instructions that read inputs or data from the various sensors and external interfaces 156, 158, 160, calculates transmission strategies, and drives the various outputs corresponding to transmission and/or torque converter configuration. The program code 166 includes, in various embodiments, a shift module 168 that determines when gear shifts in the transmission should occur. The program code 166 also includes a speed calculation module 170 that calculates a desired engine speed when reengaging the lockup clutch 142, as discussed more below. The program code 166 also includes, in an embodiment, executable code in a communications module 172 that manages data communication over the control bus 126, such as communication with the engine controller 128 using a J1939 protocol.

INDUSTRIAL APPLICABILITY

In general, the present disclosure can find industrial applicability in a number of different settings. For example, the teachings of the present disclosure may be employed for use in different machines, such as but not limited to the earth-moving, construction, mining, agriculture, transportation, and marine industries.

Figure 5:
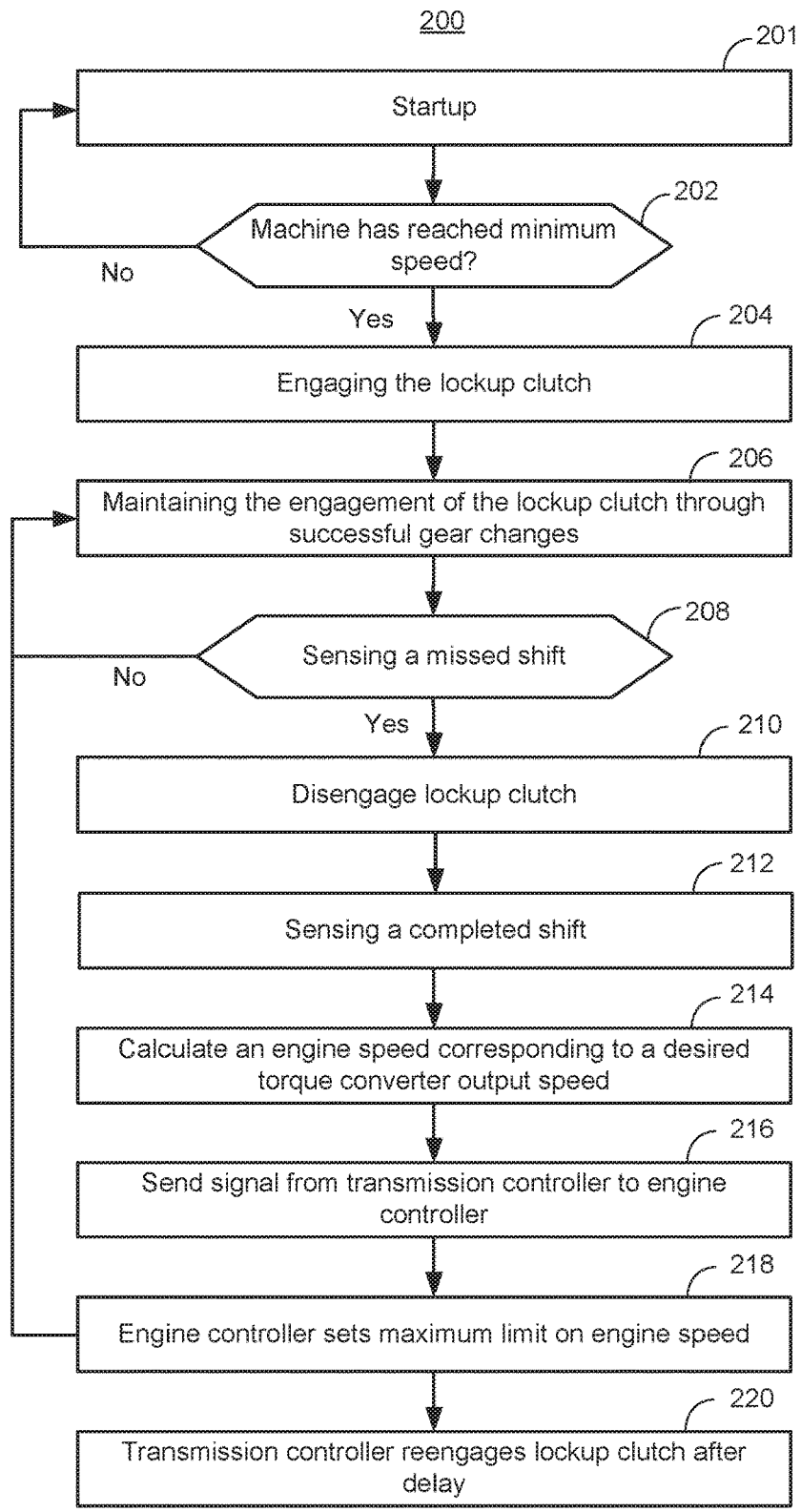
FIG. 5 is a flowchart of an exemplary method of performing torque converter lockup clutch control according to the present disclosure.

A method 200 of performing shift recovery in a machine 90 is illustrated in FIG. 5. In an embodiment, the machine 90 is an off-road hauling machine 90 shown in FIG. 1 and includes an engine 96 coupled to a torque converter 104 with a lockup clutch 142 and a transmission 112 coupled to the torque converter 104. At block 201 the machine 90 is started and begins operation. At block 202 a determination is made as to whether the machine 90 has reached a minimum speed and/or is in a high enough gear to allow engaging the lockup clutch 142. If not, the 'no' branch is taken to block 201 and the test is repeated until the conditions for use of the lockup clutch 142 are satisfied. These conditions will vary from machine to machine but in one embodiment are related to the machine 90 being above first gear and traveling above a predetermined speed, for example, 3-5 miles per hour.

After the conditions at block 202 are satisfied, the 'yes' branch is taken to block 204 and the lockup clutch 142 is engaged. The lockup clutch 142 remains engaged at block 206 through continued operation of the machine 90 including successful gear changes including second gear and above. A process for disengaging the lockup clutch 142 either manually or when the conditions at block 202 are no longer met is not illustrated for the sake of clarity.

At block 208, the transmission controller 120 senses or determines a missed shift. As discussed above, a missed shift involves a temporary loss of engagement between gears. This determination may be made in several ways. For example, in an embodiment, because a speed of the transmission shaft 108 is known, a speed of the driveshaft 116 is known, and an expected gear ratio of the transmission 112 is known, the transmission controller 120 can determine when an expected transmission shaft speed, in revolutions per minute, diverges from a measured transmission shaft speed. In other embodiments, sensors may determine that an actuator in the transmission 112 has failed to move to an expected position.

If the shift is successful, as occurs in most cases, the 'no' branch is taken back to block 206. If the shift fails, the 'yes' branch is taken to block 210. Because the shift failed and the transmission is essentially in neutral, the load on the engine is released and the engine 96 will increase its speed accordingly, especially when the engine 96 was under a high load condition as discussed above. As discussed above, if the lockup clutch 142 is engaged and the engine 96 is reconnected to the driveshaft 116 while in this high rpm condition, the torque spike can be destructive. At block 210, the lockup clutch 142 is disengaged. Because the lockup clutch 142 is disengaged, the hydraulic coupling of the torque converter 104 is in place to absorb a transmitted shock, should it occur, when the shift eventually completes. In an embodiment, the transmission controller 120 sends a signal to the torque converter 104 to disengage the lockup clutch 142 responsive to determining that a shift failed.

After the shift completes, often in well less than 1 second, the transmission controller 120 senses the completed shift at block 212. The completed shift is most often into the gear originally intended, but in some cases may be to a different gear. The transmission controller 120 is able to determine not only that the shift has completed, but is also able to determine what gear is engaged.

With knowledge of the current gear and a current speed of the transmission shaft 108, the transmission controller 120 calculates, at block 214, a desired speed of the torque converter output, that is, a desired crankshaft speed. Calculating the engine speed corresponding to the desired torque converter input speed includes, in an embodiment, determining a gear that is engaged at the transmission following sensing the completed shift and calculating from a current drive shaft speed a desired torque converter output speed. The desired torque converter input speed (i.e., crankshaft speed) is equal to the desired torque converter output speed (i.e. transmission shaft speed).

At block 216, the transmission controller sends the engine speed limit to the engine controller 128 via the control bus 126 to set a maximum on engine speed. The engine controller 128 will immediately begin reducing engine speed. The transmission controller 120 has empirical knowledge of the rate at which the engine speed will decay and at block 220 will re-engage the lockup clutch 142 after a delay based on the decay rate. The inventors have observed that the decay rate is predictable for a given set of conditions. Therefore, feedback from the engine controller 128 on actual engine speed is not required before reengaging the lockup clutch 142. In an embodiment, the delay time is in a range of 200 milliseconds to 300 milliseconds, with the entire process occurring in a range of 450 milliseconds to 550 milliseconds. In an embodiment, the engine rpm may decay from about 1800 rpm to 1300 rpm during the delay time between the engine limit signal being sent by the transmission controller 120 and the re-engagement of the lockup clutch 142. No feedback on engine state is sent from the engine controller 128 to the transmission controller 120.

The various apparatus and methods discussed above benefit both manufacturers and operators of off-road machines and other equipment that is prone to missed shifts and the resulting damage to drivetrain components during torque peaks. Manufacturers increase equipment reliability and reduce warranty costs when torque spikes are avoided. Operators benefit when their equipment performs reliably and does not need to be taken out of service for repairs or other maintenance.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method of performing shift recovery in an off-road machine having an engine coupled to a torque converter with a lockup clutch and a transmission coupled to the torque converter, the method comprising:
    engaging the lockup clutch of the off-road machine when the off-road machine reaches a minimum threshold speed;
    maintaining the engagement of the lockup clutch during operation of the off-road machine including normal shifting between gears of the transmission;
    sensing a missed shift between gears in the transmission;
    disengaging the lockup clutch responsive to sensing the missed shift;
    sensing a completed shift of the gears of the transmission;
    calculating an engine speed corresponding to a desired torque converter output speed;

setting a speed limit for the engine corresponding to the calculated engine speed; and reengaging the lockup clutch following a delay time.

2. The method of claim 1, wherein engaging the lockup clutch occurs while the transmission of the off-road machine is in a gear above a first gear.

3. The method of claim 1, wherein sensing the missed shift comprises sensing a change in revolutions per minute of a transmission shaft at a transmission controller.

4. The method of claim 1, wherein disengaging the lockup clutch comprises receiving a signal from a transmission controller that causes the lockup clutch to disengage.

5. The method of claim 1, wherein calculating the engine speed corresponding to the desired torque converter output speed comprises:
    determining a gear that is engaged at the transmission following sensing the completed shift;
    calculating from a current transmission shaft speed the desired torque converter output speed;
    calculating a desired torque converter input speed based on the desired torque converter output speed; and
    calculating the speed limit for the engine to provide the desired torque converter input speed.

6. The method of claim 5, further comprising:
    calculating the delay time corresponding to a known revolutions per minute decay time for the engine.

7. The method of claim 6, wherein the missed shift occurs when the engine is under a load and the delay time is a range of 250-300 milliseconds.

8. A method of recovering from a missed shift in an off-road machine, the off-road machine including an engine and a transmission that are coupled by a torque converter having a lockup clutch, the method comprising:
    disengaging the lockup clutch responsive to sensing the missed shift between gears of the transmission;
    sensing a completed shift between gears of the transmission;
    calculating a desired torque converter output speed corresponding to a transmission gear ratio for the completed shift;
    calculating a desired engine speed necessary to reach the desired torque converter output speed;
    setting an engine speed limit corresponding to the desired engine speed; and
    reengaging the lockup clutch of the torque converter to mechanically couple the engine to the transmission following a delay time.

9. The method of claim 8, further comprising engaging the lockup clutch after the off-road machine reaches an initial minimum speed from a full stop.

10. The method of claim 8, wherein reengaging the lockup clutch of the torque converter to mechanically couple the engine to the transmission comprises reengaging the lockup clutch absent feedback related to engine speed.

11. The method of claim 8, wherein setting the engine speed limit comprises sending a signal from a transmission controller to an engine controller, the signal containing the desired engine speed.

12. The method of claim 11, wherein the engine speed limit is set for a duration in a range of 250 milliseconds to 350 milliseconds.

13. The method of claim 11, wherein calculating the desired torque converter output speed comprises determining a gear setting for the transmission, determining a drive shaft speed and calculating a transmission input speed from the gear setting and the drive shaft speed.

14. The method of claim 8, wherein reengaging the lockup clutch comprises receiving a signal at the torque converter from a transmission controller to reengage the lockup clutch.

15. A system for managing a lockup clutch for shift recovery in an off-road truck, the system comprising:
    an engine;
    a transmission;
    a torque converter coupled between the engine and the transmission, the torque converter having the lockup clutch that when engaged directly couples the engine to the transmission;
    a transmission controller that disengages the lockup clutch responsive to sensing a missed shift in the transmission, senses a subsequent completed shift, sets an engine speed limit corresponding to a gear associated with the completed shift, and reengages the lockup clutch.

16. The system of claim 15, further comprising a sensor coupled to the transmission controller that reports a transmission input speed, a transmission output speed, and the engaged gear, the engaged gear defining a speed ratio between the transmission input speed and the transmission output speed.

17. The system of claim 15, further comprising a communication bus between the transmission controller and an engine controller.

18. The system of claim 17, wherein the communication bus is an SAE J1939 compliant bus.

19. The system of claim 15, wherein the transmission controller reengages the lockup clutch after a delay time.

20. The system of claim 19, wherein the transmission controller selects the delay time according to a known engine speed decay profile and a lockup clutch engagement time.

* * * * *